Dec. 1, 1936.     Z. SOCHOR     2,062,945
MACHINE FOR THE WET TREATMENT OF MATERIALS
Filed Nov. 8, 1935
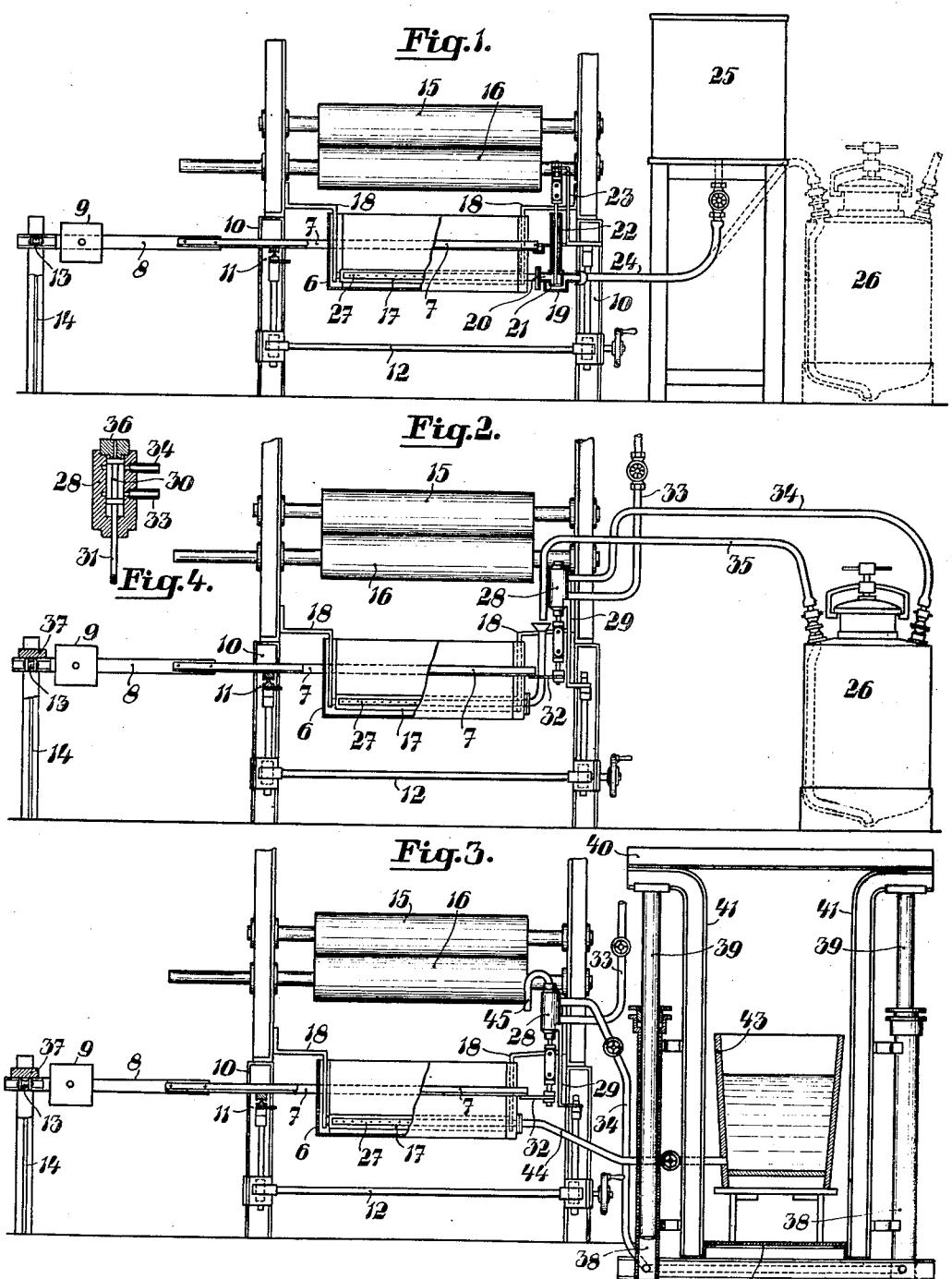
Inventor:
Zděnek Sochor
By Emil Bönnelyke — Attorney Patented Dec. 1, 1936

2,062,945

UNITED STATES PATENT OFFICE 2,062,945

MACHINE FOR THE WET TREATMENT OF MATERIALS

Zdeněk Sochor, Dvur Kralove nad Labem, Czechoslovakia

Application November 8, 1935, Serial No. 48,936
In Czechoslovakia June 1, 1934

8 Claims. (Cl. 8—19)

In the finishing of woven fabrics, and also in other operations, for example in the development of films, in which a strip of fabric, paper, or other material is drawn through a liquid, it is a requirement, for the purpose of obtaining a perfectly uniform product and for the purpose of economizing in liquid, that working should be effected with a liquid level that is always constant. In particular, in fabric dyeing the tint of the colour produced depends chiefly on the height of the dye liquor in the dyeing trough.

Now the most primitive mode of regulating the liquid level is that the workman observes the liquid level constantly and regulates the supply of supplementary liquid by hand. It is consequently necessary to have the constant attention and work of an attendant on whose conscientiousness depends the quality of the produced goods. Consequently a float has been used that regulates automatically the supply of supplementary liquid and secures an always constant liquid level in the receptacle. This solution of the problem, however, is attended by disadvantages which appear in particular in the case of the employment of thick liquids such as frequently occur in dyeing, since a satisfactory operation is interfered with by the dirtying of the sensitive float-lever arrangement. Also such floats tend to leak and thus to produce breakdowns. Apart from this, the receptacles must be suitably widened for the accommodation of the float and in this way again the necessary quantity of liquid is increased. Finally, proposals have been made to put the liquid in the receptacle into constant circulation by means of a pump and thus to maintain the same height constantly. This arrangement, however, has disadvantages, because, on the one hand, a receptacle more is necessary for the pumping round of the liquid, and, on the other hand, after the completion of the working operation some of the liquid remains in each receptacle and also in the pump, the result of which is an increase of the amount of liquid used and also an increase of the time necessary for cleaning.

Now the invention utilizes the knowledge that the supply of liquid can be regulated by means of the hydraulic pressure in a receptacle, as for example is known in apparatus for constant and uniform dosing or in apparatus for the automatic regulation of the delivery of a liquid, for the purpose of automatically maintaining the level of the liquid (dye liquor) always at the same and predetermined height in the treating receptacle of the full-width wet-treatment machines for fabrics.

Consequently the invention consists principally in that the supply of supplementary liquid is controlled indirectly or directly by the weight varying in the course of the working operation or by the varying hydraulic pressure of the liquid contained in the receptacle. This may be effected in a simple manner by mounting the guiding element leading the strip to be treated through the liquid in the machine frame independently of the liquid receptacle, and so suspending the receptacle itself movably, for example balanced by means of a counterweight or the like, that hydrostatic pressure variations cause variations of position of the vessel which by means of a stationarily arranged controlling device regulate the supply of liquid in the sense of an always constant liquid level. Consequently when the liquid level sinks in the receptacle, the receptacles moves upwards under the action of the constant counterweight and puts the controlling device into operation so that liquid is supplied. When the desired liquid level is again reached, the receptacle sinks and shuts off the supply automatically.

The same object may, however, be attained also in the case of a stationarily arranged receptacle by means of a member, for example a membrane, influenced by the hydraulic pressure of the liquid column located thereover, the movement of the membrane being utilized to control the supply of liquid. In all cases the control may be direct, the movement caused by the change of the liquid level being transmitted mechanically to a controlling element or indirect, a pressure medium (compressed air, pressure water, or the like) or electric circuits being switched in and out and regulating the supply of the liquid.

In the drawing several constructional examples of the subject-matter of the invention are shown in its application to dye machines in Figs. 1, 2, and 3, whilst Fig. 4 shows in section and to a larger scale a detail of the controlling device according to Fig. 2.

In all three constructional forms the receptacle 6 that contains the liquid (dye liquor) is fastened on an arm 7 of a double lever 7, 8 which on its arm 8 carries so as to be movable, a counterweight 9. The double lever 7, 8 rests in the machine frame 10 on a knife-edge 11, which can be raised and lowered by means of gear 12. For the purpose of guiding the double lever 7, 8 there are provided at the front at 8 rollers 13, which run between guide-rails 14. Of course the receptacle 6 may also be laterally guided, suspended on tension devices and balanced by counterweights. Over the receptacle 6 are mounted the rollers 15, 16 that feed the continuous material to be treated, whilst there dips or dip into the receptacle 6 one or more rollers 17 which are mounted in rectangularly bent arms 18 fastened to the machine frame 19 and consequently quite independently of the receptacle 6 lead the material through the liquid in the receptacle 6.

Firmly connected to the receptacle 6 is a valve-casing 19 with a valve-seat 20, whilst the corresponding valve-plate 21 is fastened by means of its rod 22 to a bow 23. This bow 23 is supported by the gear 12 provided for raising and lowering the knife-edge 11 and is moved thereby to the same extent as the knife-edge 11, so that the relative position of the valve-plate 21 and seat 20 remains constant during the vertical adjustment of the knife-edge. To the valve-casing 19 there is connected by means of a flexible pipe 24 a receptacle 25 located at a higher level for the supplementary liquid. There may, however, be provided, as indicated by dotted lines, a pressure receptacle 26 in which the liquid is under a pressure above that of the atmosphere.

The adjustment of the counterweight 9 is selected in such a manner that as soon as the liquid level necessary for the carrying out of the desired process is reached in the receptacle 6 the valve plate 21 rests on its seat 20. When, in the course of the process, liquid is used, the liquid level sinks in the receptacle 6. This becomes lighter and swings upwards under the action of the counterweight 9 and the result of this is that the valve seat 20 rises with it, whilst the valve plate 21 remains at rest. In this way the valve is opened and liquid passes from the receptacle 25 or 26 through the pipe 24 into the receptacle 6 and is distributed therein by means of a distributing pipe 27 provided with holes. When the liquid level has again reached the predetermined height, the receptacle 6 swings back and the valve is closed. This operation is always repeated automatically as soon as the receptacle 6 sinks, with the result that the same liquid level is always maintained.

In the case of the constructional form according to Fig. 2 a valve-casing 28 is connected by a rod 29 with the gear 12 so that when the knife-edge 11 rises and falls it rises and falls therewith. In the casing 28 there is provided a controlling piston 30 on a rod 31 which is firmly connected at 32 with the receptacle 6. By means of a pipe 33 the casing 28 is connected with a source of compressed air; from the casing 28 a pipe leads to the pressure receptacle 26.

When the liquid level falls in the receptacle 6, the receptacle 6 swings upwards and takes the controlling piston 30 with it into the position shown in Fig. 4 by means of the rod 31. Consequently compressed air passes through the pipe 34 into the pressure receptacle 26 and presses the liquid through the pipe 35 into the receptacle 6. When the normal liquid level is reached, the receptacle 6 sinks and the upper controlling surface of the piston 30 closes the pipe 34 so that no more compressed air can enter the receptacle 26. Should, however, the valve leak and further liquid be pressed to the receptacle 6, the receptacle 6 swings further downwards and the controlling piston 30 liberates the opening of the pipe 34 so that the compressed air located in the receptacle 26 can pass through the opening 36 in the cap of the casing 28 into the external atmosphere. In order to prevent further sinking of the receptacle 6, there is provided a rider weight 37, which, when the double lever 7, 8 rocks beyond the normal position, is raised and balances the additional weight.

In the case of the arrangement according to Fig. 3 a pressure medium is controlled by a valve exactly as in the case of the arrangement according to Fig. 2. In the present case pressure water is provided, which passes into the valve casing 28 by means of the pipe 33 and out of the valve casing 28 by means of the pipe 34. The pipe 34 leads to two cylinders 38 the pistons 39 of which are connected by a bridge 40. From this bridge there is suspended by means of arms 41 a platform 42 on which stands an open liquid receptacle 43, which is connected by means of a flexible rubber pipe 44 with the receptacle 6. The receptacle 6 and the trough 43 consequently communicate with each other.

When, now, the liquid level sinks in the receptacle 6, the valve 28 comes into operation in the hereinbefore described manner, and pressure water passes through the pipe 34 under the pistons 39, with the result that the trough 43 is raised and consequently liquid passes through the flexible pipe 44 into the receptacle 6. When the normal liquid level is reached in the receptacle 6, the valve 28 closes again and the upward movement of the trough 43 stops. Should the valve 28 leak and consequently more liquid pass into the receptacle 6, the receptacle 6 continues its swinging movement downwards and moves the controlling piston 30 into the lowest position in which the pressure water pipe 34 is put into communication with atmosphere through the pipe 45, with the result that the pistons 39 sink and take with them the trough 34. Also in this case there is provided a riding weight 37.

It will be obvious without further explanation that electrical contacts may be opened and closed in a suitable manner which are in the position to carry out the operations just described. Also, the relative movement that occurs in the case of the constructional examples described between the liquid receptacle and the machine frame under the influence of the weight of the liquid in the receptacle may be restricted to a part of the container, in which case this is fixedly arranged. Only a part of the receptacle, for example a membrane inserted near the bottom, then executes movements under the action of the column of liquid loading it as soon as the height of the liquid changes, which movements are then utilized directly or indirectly for the control of the liquid supply or for the control of a pressure medium or an electric circuit in the sense of a regulated supply of supplementary liquid.

What I claim is:—

1. Machine for the wet treatment of material comprising a frame, a reservoir, a treating bath suspended in said frame and replenishable from said reservoir, means fixed on the frame for moving the material through the treating bath, means for balancing the suspended treating bath whereby variations in the absolute weight of its liquid contents produce corresponding movements of the bath relatively to the frame, and means for regulating flow of liquid from said reservoir into the bath to maintain an amount of liquid of constant weight in the latter, said regulating means having a stationary member co-operating with a member which is responsive to the movements of the bath.

2. Machine for the wet treatment of material comprising a frame, a reservoir, a beam pivoted in said frame, a treating bath attached to said beam and replenishable from the reservoir, means on said beam for balancing the treating bath whereby variations in the absolute weight of its liquid contents produce corresponding movements of the bath relatively to the frame, means fixed on the frame for moving the material through the treating bath, and means for regulating flow of liquid from said reservoir into the bath to maintain an amount of liquid of constant weight in the latter, said regulating means having a stationary member co-operating with a member which is responsive to the movements of the bath.

3. Machine for the wet treatment of material comprising a frame, a reservoir, a beam pivoted in said frame, a treating bath attached to said beam and replenishable from the reservoir, means on said beam for balancing the treating bath whereby variations in the absolute weight of its liquid contents produce corresponding movements of the bath relatively to the frame, means fixed on the frame for moving the material through the treating bath, means for regulating flow of liquid from said reservoir into the bath to maintain an amount of liquid of constant weight in the latter, said regulating means having a stationary member co-operating with a member which is responsive to the movements of the bath, and means for adjusting the height of the axis of pivoting of the beam.

4. Machine for the wet treatment of material comprising a frame, a reservoir, a treating bath suspended in said frame and replenishable from said reservoir, means fixed on the frame for moving the material through the treating bath, means for balancing the suspended treating bath whereby variations in the absolute weight of its liquid contents produce corresponding movements of the bath relatively to the frame, and a valve comprising a valve body and a casing for regulating flow of liquid from said reservoir into the bath to maintain an amount of liquid of constant weight in the latter, one of these valve parts being attached to the frame and the other to the bath in such a manner that the valve is opened when the bath rises and closed when it falls from the normal balanced position.

5. Machine for the wet treatment of material comprising a frame, a reservoir, a beam pivoted in said frame, means for adjusting the height of the axis of pivoting of the beam, a treating bath attached to said beam and replenishable from the reservoir, means on said beam for balancing the treating bath whereby variations in the absolute weight of its liquid contents produce corresponding movements of the bath relatively to the frame, means fixed on the frame for moving the material through the treating bath, and a valve comprising a valve body and a casing for regulating flow of liquid from said reservoir into said treating bath to maintain an amount of liquid of constant weight in the latter, one of these valve parts being attached to the said adjusting means whereby it is raised and lowered with the said axis and the other being attached to the treating bath in such a manner that the valve is open when the bath rises and is closed when it falls from the normal position.

6. Machine for the wet treatment of material comprising a frame, a reservoir, a treating bath suspended in said frame and replenishable from said reservoir, means fixed on the frame for moving the material through the treating bath, means for balancing the suspended treating bath whereby variations in the absolute weight of its liquid contents produce corresponding movements of the bath relatively to the frame, and an auxiliary counterweight normally out of contact with the beam but adapted when the end of the beam carrying the bath moves down to ride on the other end of the beam and restore the latter to normal position.

7. Machine for the wet treatment of material comprising a frame, a reservoir, a treating bath suspended in said frame and replenishable from said reservoir, means fixed on the frame for moving the material through the treating bath, means for balancing the suspended treating bath whereby variations in the absolute weight of its liquid contents produce corresponding movements of the bath relatively to the frame, means for varying the elevation of the reservoir relatively to the normal position of the beam, and means for regulating flow of liquid from said reservoir into the bath to maintain an amount of liquid of constant weight in the latter, said regulating means having a stationary member co-operating with a member which is responsive to the movements of the bath to actuate the means for varying the elevation of the reservoir.

8. Machine for the wet treatment of material comprising a frame, a reservoir, a beam pivoted in said frame, a treating bath attached to said beam and replenishable from the reservoir, means on said beam for balancing the treating bath whereby variations in the absolute weight of its liquid contents produce corresponding movements of the bath relatively to the frame, means fixed on the frame for moving the material through the treating bath, fluid pressure means for producing flow of liquid from the reservoir into the treating bath and a valve comprising a valve body and casing for regulating the fluid pressure means to maintain constant liquid level in the bath, one of said valve parts being attached to the frame and the other to the bath in such a manner that the valve is opened when the bath rises and closed when it falls from the normal balanced position.

ZDENĚK SOCHOR.